United States Patent
Feinstein

(10) Patent No.: US 7,970,676 B2
(45) Date of Patent: Jun. 28, 2011

(54) METHOD AND SYSTEM FOR MODELING FUTURE ACTION IMPACT IN CREDIT SCORING

(75) Inventor: Jeffrey A. Feinstein, Roswell, GA (US)

(73) Assignee: Fair Isaac Corporation, Minneapolis, MN (US)

( * ) Notice: Subject to any disclaimer, the term of this patent is extended or adjusted under 35 U.S.C. 154(b) by 319 days.

(21) Appl. No.: 11/832,610

(22) Filed: Aug. 1, 2007

(65) Prior Publication Data

US 2009/0037308 A1 Feb. 5, 2009

(51) Int. Cl.
*G06Q 40/00* (2006.01)

(52) U.S. Cl. ............ 705/35; 705/36; 705/38; 705/39; 705/42

(58) Field of Classification Search .......... 705/35–45
See application file for complete search history.

(56) References Cited

U.S. PATENT DOCUMENTS

| | | | | |
|---|---|---|---|---|
| 6,405,173 | B1 * | 6/2002 | Honarvar et al. ............. | 705/7 |
| 7,383,215 | B1 * | 6/2008 | Navarro et al. ............. | 705/36 R |
| 2006/0233332 | A1 | 10/2006 | Toms | |
| 2007/0005473 | A1 | 1/2007 | Ho | |
| 2007/0208640 | A1 * | 9/2007 | Banasiak et al. ............. | 705/35 |

OTHER PUBLICATIONS

Title: "Improving Clustering Analysis for Credit Card Accounts Classification", Book Title: "Computational Science—ICCS 2005, 5th International Conference. Proceedings, Part III", Authors: Yi Peng 1; Gang Kou 1; Yong Shi 1; Zhengxin Chen 1, pp. 548-553, Publication Date 2005.*

* cited by examiner

*Primary Examiner* — Ella Colbert
*Assistant Examiner* — Hai Tran
(74) *Attorney, Agent, or Firm* — Mintz, Levin, Cohn, Ferris, Glovsky and Popeo, P.C.

(57) ABSTRACT

A method and system for predicting impact of future actions on subsequent performance involves developing a prediction model that predicts a statistical interaction of performance expectation with likely behavior. In one embodiment, sensitivity to new, post-scoring date credit behaviors in the analytic solution greatly improves snapshot score predictions. The modeling approach involves multiple snapshots: predictive and performance snapshots, plus an intermediate snapshot shortly after the predictive snapshot to quantify interim behavior. Predictive interaction variables are calculated on the predictive data using simulated profiles before and after an action.

21 Claims, 13 Drawing Sheets

**Capacity framework
Risk response to *future* debt**

Harry, Mary and Larry – Similar FICO Score

METHOD AND SYSTEM FOR MODELING FUTURE ACTION IMPACT IN CREDIT SCORING

BACKGROUND OF THE INVENTION

1. Technical Field

The invention generally relates to predictive model development. More particularly, the invention relates to a method and system for modeling impact of future actions that are unknown at scoring date in quality assessments at the scoring date.

2. Background Information

Model based decisions are often based on data in which the intention is that the data changes as a consequence of the use of data. A frozen score, therefore, predicts an outcome assuming that all else is held equal. The technology herein goes further to include a person's tolerance to the range of possible changes that may occur shortly after the scoring date. This approach is referred to as future action impact modeling, in that it includes the range of possible future behavior into a fixed observation date occurring before these potential behaviors occur.

Standard modeling problems typically involve two snapshots. One is called the pred (predictive) snapshot, referred to as the scoring date in implementation; the other, the perf. (performance) snapshot. Typically, at time one ($T_1$), a model is built to predict performance at time two ($T_2$). This is true of any standard analytic model where at time two, there would be one of a variety of performances—for example, risk or revenue. This modeling approach is common not just in financial services and credit, but in insurance and other areas. Performances are generally denoted by zeroes and ones—representing—in the credit scoring field, for example—"goods" and "bads." A "bad" may be a default, or a delinquency, for example; a "good" is payment as agreed. Using credit bureau data and risk scores, it is possible to paint a picture of one's credit at one time, and then to predict what the picture will look like at another time.

These models, however, only include the consumer's history at the predictive data and prior, and as such, cannot address the relative impact of debts incurred shortly after the scoring date. This is an important question because most uses of a predictive score are designed to make a credit decision where a change after the scoring date is particularly likely.

Typically, a lender gets a score at a first time to make a lending decision at the first time. Subsequently, the lender desires to predict the borrower's performance. In attempting to predict borrower performance, the lender may rank order borrowers based on a score such as a FICO (FAIR ISAAC CORPORATION, Minneapolis Minn.) score, a behavior score, some other kind of risk or revenue score in order to predict borrower performance. However, such scores do not reflect events, such as incurring additional debt, after the scoring date.

Experience has shown that credit bureau data is considerably more reliable than consumer-supplied data for determining creditworthiness. Lenders, therefore often use risk scores calculated from credit bureau data in evaluating creditworthiness, for example the FICO (FAIR ISAAC CORPORATION, Minneapolis Minn.) score. The FICO score predicts default risk from a credit bureau report snapshot. While the FICO score accurately assesses default risk based on static credit bureau information, it does not consider information not yet represented on credit reports, such as new debt. Additionally, while people with the same score represent the same risk, different consumer profiles in which baseline risk is the same get the same score even though these consumers may respond differently to subsequent changes in credit.

In any scoring system, there are a variety of different profiles which numerically equate to the same relative odds. Because there are a variety of such profiles, there is opportunity to further identify records with a similar probability of performance, i.e. score, but differ in their tolerance to the range of future possible behaviors.

SUMMARY OF THE INVENTION

The invention provides a method and apparatus for future action impact modeling. In one embodiment, a method and apparatus for predicting impact of future actions on subsequent performance involves developing a prediction model that predicts a statistical interaction of performance expectation with likely future behavior. Including sensitivity to new behaviors in an analytic solution greatly improves snapshot predictions. The modeling approach involves multiple snapshots: predictive and performance snapshots, plus an intermediate snapshot shortly after the predictive snapshot to quantify interim behavior. For example, in one embodiment predictive interaction variables are calculated on the predictive data using simulated consumer profiles before and after assuming a sizeable simulated balance to infer the consumer's tolerance for incremental future debt. In this embodiment, using an adjustor approach in predicting capacity allows isolation of the confounding effect of risk from the capacity determination. A resulting capacity index can be used to rank order originations and line increases according to capacity in consumer, bankcard, automobile and mortgage lending.

DETAILED DESCRIPTION

The invention provides a method and apparatus for future action impact modeling. In one embodiment, A method and apparatus for predicting impact of future actions on subsequent performance involves developing a prediction model that predicts a statistical interaction of performance expectation with likely future behavior. Including sensitivity to new behaviors in an analytic solution greatly improves snapshot predictions. The modeling approach involves multiple snapshots: predictive and performance snapshots, plus an intermediate snapshot shortly after the predictive snapshot to quantify interim behavior. For example, in one embodiment predictive interaction variables are calculated on the predictive data using simulated consumer profiles before and after assuming a sizeable simulated balance to infer the consumer's tolerance for incremental future debt. In this embodiment, using an adjustor approach in predicting capacity allows isolation of the confounding effect of risk from the capacity determination. A resulting capacity index can be used to rank order originations and line increases according to capacity in consumer, bankcard, automobile and mortgage lending.

Figure 1:
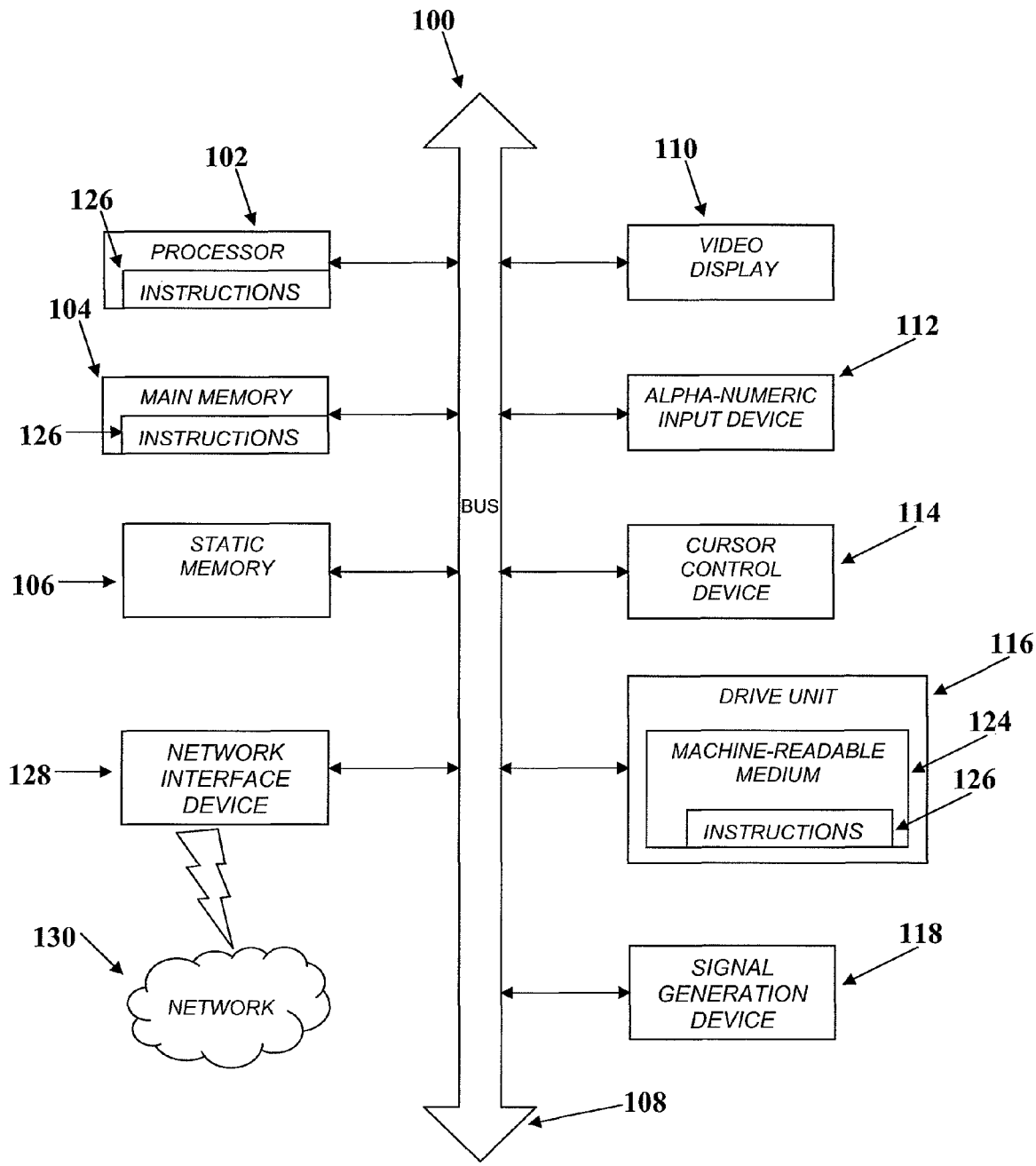
FIG. 1 is an exemplary diagram of a data processing system in which the present invention may be implemented.

FIG. 1 shows a diagrammatic representation of a machine in the exemplary form of a computer system 100 within which a set of instructions, for causing the machine to perform any one of the methodologies discussed herein below, may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 100 includes a processor 102, a main memory 104 and a static memory 106, which communicate with each other via a bus 108. The computer system 100 may further include a display unit 110, for example, a liquid crystal display (LCD) or a cathode ray tube (CRT). The computer system 100 also includes an alphanumeric input device 112, for example, a keyboard; a cursor control device 114, for example, a mouse; a disk drive unit 116, a signal generation device 118, for example, a speaker, and a network interface device 120.

The disk drive unit 116 includes a machine-readable medium 124 on which is stored a set of executable instructions, i.e. software, 126 embodying any one, or all, of the methodologies described herein below. The software 126 is also shown to reside, completely or at least partially, within the main memory 104 and/or within the processor 102. The software 126 may further be transmitted or received over a network 128 by means of a network interface device 120.

In contrast to the system 100 discussed above, a different embodiment of the invention uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Preferred Embodiment

Model based decisions are often based on data in which the intention is that the data changes as a consequence of the use of data. A frozen score, therefore, predicts an outcome assuming that all else is held equal. The technology herein goes further to include a person's tolerance to the range of possible changes that may occur shortly after the scoring date. This approach is referred to as future action impact modeling, in that it includes the range of possible future behavior into a fixed observation date occurring before these potential behaviors occur.

Generally, a snapshot-based score is used in relation to a specific activity or event. For example, when a consumer is purchases a home, a lender assesses the consumer's creditworthiness with a risk score. However, by definition, the action of purchasing the house changes the consumer's creditworthiness. Thus, it would be a great advantage to be able to, essentially, include the impact of a decision or the implications of potential decisions and other actions.

An embodiment of the invention includes a modeling approach that incorporates not only the two snapshots usually used, but a third, intermediate snapshot, or some data representing intermediate behaviors occurring between the two snapshots.

Preferably, the intermediate information or snapshot is used to (1) define a component of the interaction performance variable along with their "good/bad" status at the end of the development time period; and to (2) validate the model using a real change, such as a credit change, after the scoring date. In other words, the present modeling approach gathers data regarding the consumer's conduct after the scoring date and includes it in the performance definition of the development process, saying, in effect, that there is an interaction between the intermediate behavior and subsequent performance; and then endeavoring to predict this interaction directly during model development using predictive information available from the first "predictive" snapshot. The invention recognizes and accounts for the fact, in the present, that intermediate actions taken after the scoring date have an effect on the individual's future profile, for example, some will become riskier, some less risky as a function of the intermediate behavior and their profile at the predictive snapshot.

While the exemplary embodiment of the invention set forth herein preferably utilizes credit-bureau information to generate the predictive characteristics, other data aggregated across all obligations of a target entity (for an individual, household, customer relationship, machine, etc.) can be used; and the application of the general modeling approach is not limited to credit data and/or dimensions. Indeed, any sort of model predicting behavior that may occur in the proximal future with regard to a performance definition even further in the future can use the methodology herein described.

Figure 2:
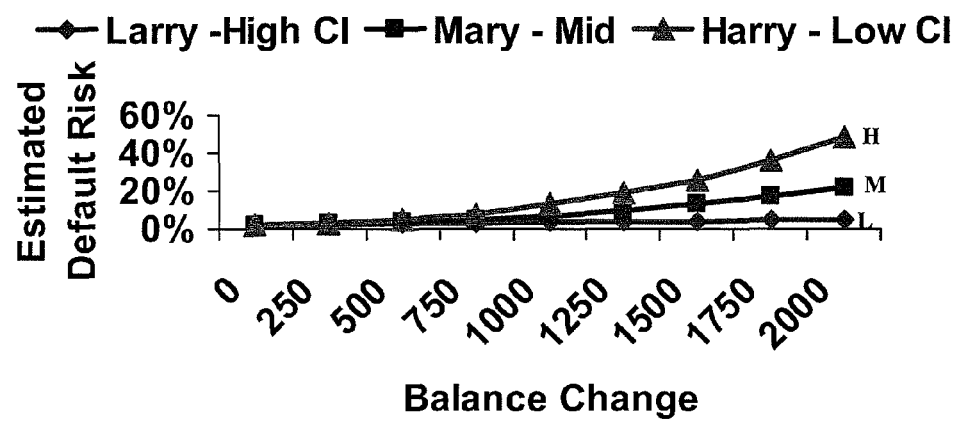
FIG. 2 provides a graph depicting the theoretical framework for the invention.

Referring now to FIG. 2, shown is a graph that depicts the theoretical framework of the invention which, solely for purposes of example, is presented as—risk response to future debt. The graph shows the future default rate (y-axis) of three separate prototypical individuals, Harry, Mary, and Larry, each with identical risk scores indicating the same probability of future default under the typical implementation assumption of the FICO score (or indeed, any predictive score algorithm designed to predict the probability of a binary performance definition)—about 680, for example—as a function of balance change (x-axis). Because there are multiple consumer profiles that may indicate the same default probability at a point in time, the invention, in this embodiment, employs an algorithm that drills deeper into the consumer profiles to identify finely-granulated cohorts of individuals having varying sensitivity to actions taken after the scoring date. Consequently, the ordinarily-skilled practitioner will readily appreciate from the graph that, in spite of the similarity in their risk scores—their expected default rate—each of the three individuals is affected by additional debt in a unique way. For example, by examining the change in default rate (y-axis) as a function of incremental debt incurred after the scoring date (x-axis), it is seen that Harry's curve is nearly flat, showing that Harry's default risk is nearly unchanged as a function of taking on additional debt. In other words, Harry's capacity is relatively high. Thus, the impact of future actions is different in each case.

On the other hand, Larry shows a steep upward curve as balance incrementally increases. Thus, as Larry's debt increases, his default risk increases, sharply, compared to Harry and Mary. Thus, Larry is said, within the context of the invention, to have relatively lower capacity. It is apparent that Mary's capacity is at an intermediate level.

One who has had delinquencies has failed in the past to juggle his or her debts and is more likely in the future to be unable to juggle his or her debts than the one having a demonstrated ability to juggle debt. Therefore, if one has very high debt, one probably has few or no delinquencies. If one has a high delinquency rate, one probably has a lower debt, particularly in the middle region, i.e. ≈30 percent default risk on the y-axis in FIG. 2.

Thus, in this example, even among individuals having substantially identical risk, there are clearly different profiles of how someone will respond to additional debt (future actions).

Figure 3:
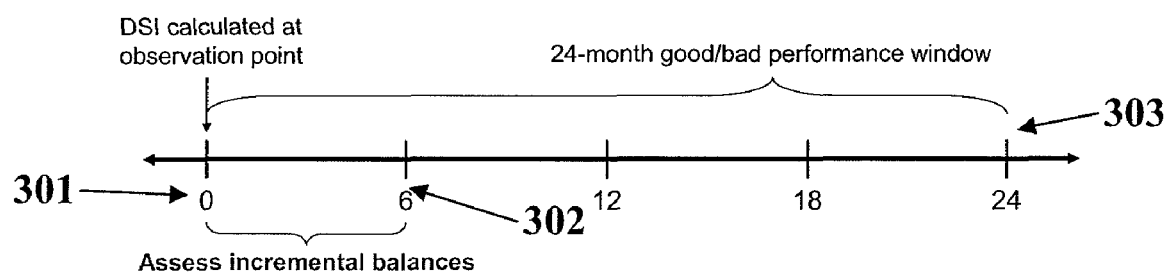
FIG. 3 provides a diagram of a three-snapshot approach to modeling impact of future actions on credit risk.

FIG. 3 provides a chart illustrating an innovative approach 300 to FUTURE ACTION IMPACT MODELING (FAIM) that utilizes three snapshots. The three snapshots include:
predictive information 301, gathered at the scoring date;
performance information 303, gathered at the performance date; and
intermediate behavior 302.

The intermediate snapshot could be used to quantify intermediate behavior between the two snapshots. As an example, we use in a different instantiation of the FAIM that a consumer opened a consolidation Home Equity Line of Credit (HELOC) between the first and last snapshot. This fact is readily apparent looking at HELOC time on file on the performance snapshot, i.e. no intermediate snapshot is required.

The intermediate consumer behavior is used to quantify any possible consumer actions just after the scoring date 301 for a predetermined intermediate period. The intermediate dataset should be (1) shortly after the predictive dataset to quantify behavior shortly after the predictive snapshot; (2) reasonably separated from the performance snapshot such that performance change is quantified as a function of the intermediate behavior. It is possible, additionally, for the intermediate snapshot to be the same as that of the performance snapshot if the modeling environment requires it to be so. In one embodiment, the intermediate period is determined to be six months, with performance an additional 18 months later (total of 24 months). In other embodiments, the intermediate period may extend from six to twelve months after the scoring date, with performance 12 months later, for a total of 24 months. However, the ordinarily-skilled practitioner will readily recognize that there are no constraints in the modeling technology regarding the time distance between the predictive and performance snapshot.

Figure 4A:
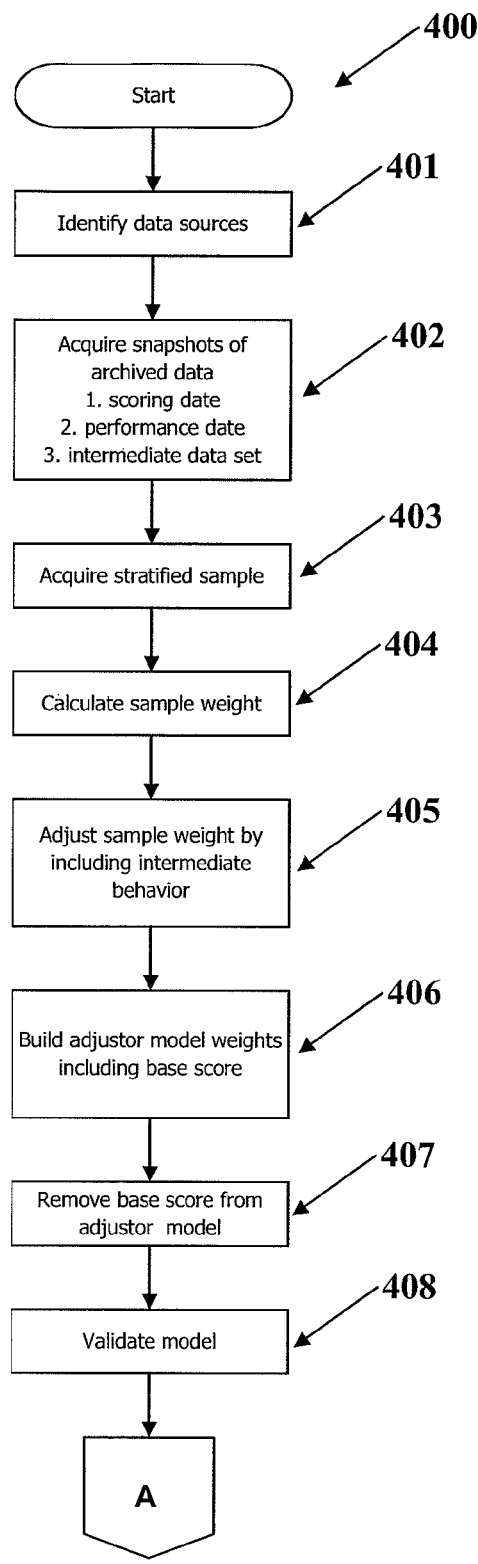
FIGS. 4a and b provide a flow diagram of a process for modeling impact of future actions on credit risk.
Figure 4B:
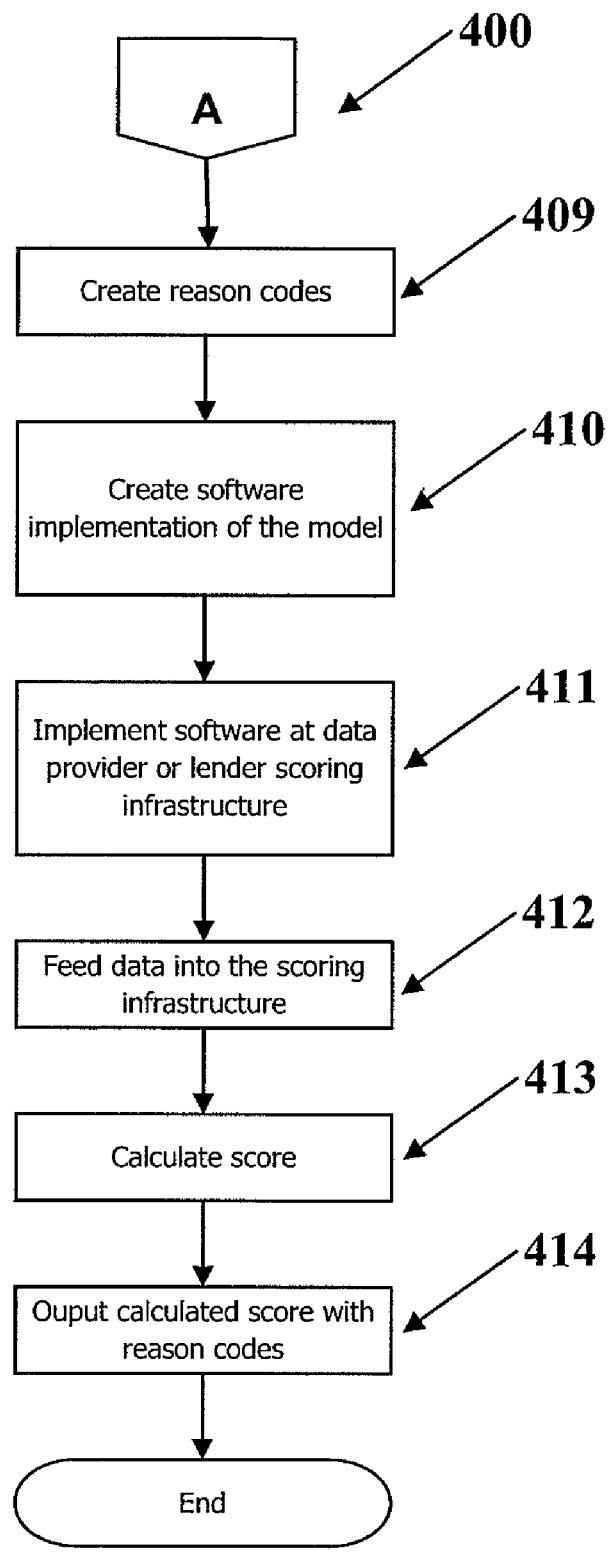

Returning to the figures, FIGS. 4a and b depict the above method for future action impact modeling (FAIM) in the form of flow diagram 400. In overview, the method includes the steps of:
identifying data sources 401;
acquiring snapshots of archived data at scoring date, performance data and intermediate date 402;
acquiring a stratified sample 403;
calculating sample weight 404;
adjusting sample weight by including intermediate behavior 405;
building adjustor model weights including base score 406;
removing base score from adjustor model 407;
validating the model 408;
creating reason codes 409;
creating a software implementation of the model 410;
implementing software at data provider of lender scoring infrastructure 411;
feeding data into the scoring infrastructure 412;
calculating score 413; and
outputting calculated score with reason codes 414.
The foregoing sequence of steps and sub-processes is meant to be exemplary only. In fact the ordering of the various steps of the method may vary considerably. Additional embodiments may include more or fewer steps than those shown in FIGS. 4a and b.

The intermediate information is incorporated into the performance definition, described herein below to calculate performance as a function of behavior at the intermediate snapshot, for example, incremental balance, as embodied in a capacity index.

Conventional modeling techniques are not designed to model interaction between terms in the performance definition. The present approach to future impact modeling implements the model as a scorecard by factoring the intermediate behavior, e.g. incremental balance, into a sample weight if some sort of stratified sampling occurred, or to create a sample weight based on incremental balance change if no sampling were conducted. Advantageously, the present modeling approach predicts an interaction rather than a main effect performance.

Interaction Performance Definition

In one embodiment, the present modeling approach addresses the problem of determining capacity. However, the modeling of the interaction of behavior and performance can be applied to other behaviors, such as change in minimum payments, future delinquency, fraud or attrition; other performance measure such as risk, revenue, attrition and fraud; and different industries, such as insurance, consumer opinions, and marketing. Additionally, the present modeling approach can be used in other non-credit applications in which human or non-human behavior is being inferred.

While one embodiment of the modeling approach is directed to interaction modeling of the consumer's behavior and performance, the ordinarily-skilled practitioner will readily appreciate that an embodiment of the present modeling approach can be used to; for example, model the interaction of external events or economic conditions and performance.

One problem that lenders are faced with is how to deal with losses given economic conditions and external events. For example, during an economic recession, unemployment rates typically increase. Using the modeling approach disclosed herein, a model can be developed, for example, that can model interaction between changes in the unemployment rate and performance. By so doing, a lender is in an improved position to modify lending policies in anticipation of economic downturns, for example. Additionally, the modeling approach is applicable to modeling problems posed by the economic shock of natural disasters such as hurricanes and earthquakes.

Other issues include cases in which incremental debt is assessed on factors that have a short term impact on a consumer's behavior with relation to a score. For example, increase in interest rates, increases in regulated minimum payments, or contractual change in payment terms such as, for example, an ARM (adjustable rate mortgage) resetting. Similarly, lenders may want to use such an approach when exposure to a consumer increases, for example where exposure increases due to an issuing institution increasing exposure to a consumer as a result of acquiring additional consumer debt owned by the acquired institution in the case of a merger or an acquisition.

In such cases, and in other embodiments of the invention, the modeling approach is similar. As of the scoring date, the risk profile is known. It is known that some type of change will occur at a second point in time, which can be measured, and that performance after that change will be affected in some way.

As described above, the model is developed from observations on a sample population. The sample population is selected from a source population of accounts from, for example, a credit reporting agency such as a credit bureau. Preferably, the sample population is then weighted in order to produce the same number of observations as in the source population. For example, from a source population of 210 million accounts, a sample population of 1 million records may be selected. In order to produce 210 million observations, each of the 1 million records would need to be given a weight of 210, resulting in a total of 210 million observations.

Different sample weights are used for different modeling problems. Thus: (1) if there is a sample weight, future balance change should be factored into it; (2) if there is not a sample weight (indeed, in this case the sample weight=1) then future balance change becomes the sample weight.

Figure 5:
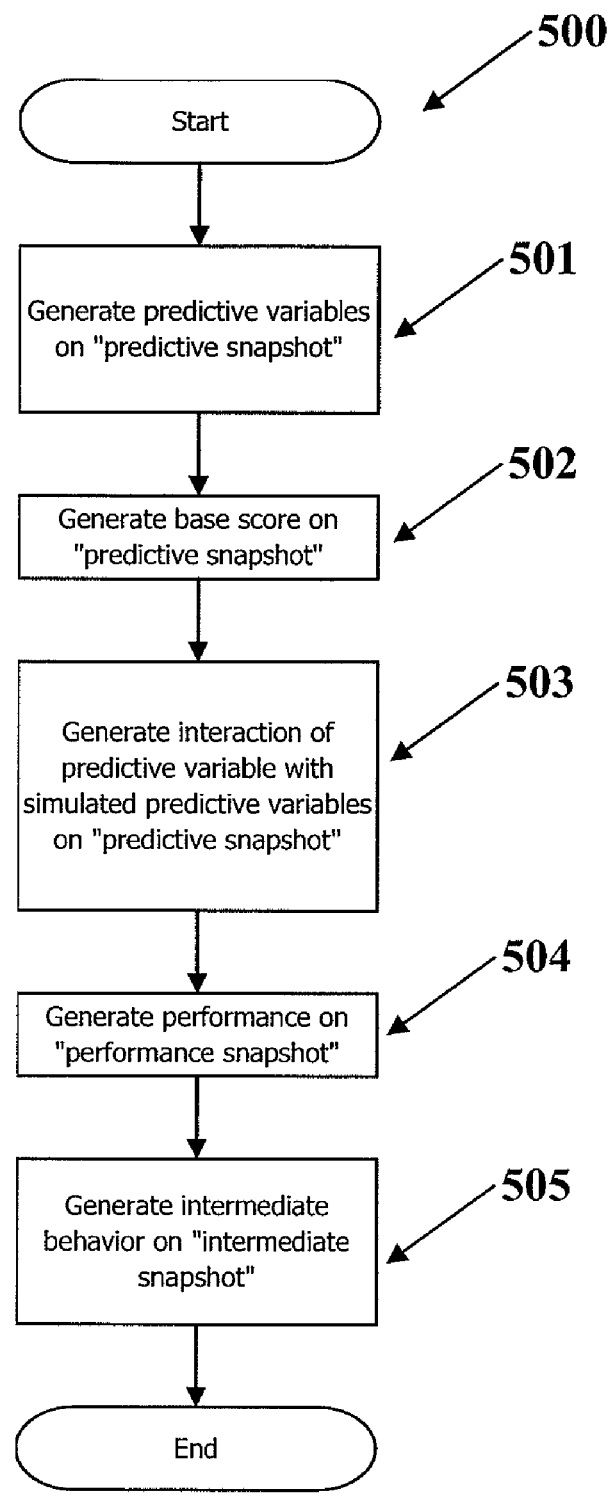
FIG. 5 provides a flow diagram of a sub-process for calculating sample weights in a stratified sample.

Referring now to FIG. 5, shown is a flow diagram of a sub-process 500 that includes the steps of:
generate predictive variables on the "predictive snapshot" 501;
generate the base score on the "predictive snapshot" 502:
generate interaction of predictive variables with simulated predicted variables on "predictive snapshot" 503;
generate performance on "performance snapshot" 504; and
generate intermediate behavior in "intermediate snapshot" 505.

As explained above in relationship to FIG. 3, an embodiment of the modeling approach employs a performance window of twenty-four months. This time span was selected because the embodiment in question is built on margin to a credit score, such as a FICO score, that itself employs a 24-month performance window. However, other embodiments of the modeling approach may employ other performance intervals of varying length, both longer and shorter, than the example, limited only by the possibility that a performance interval of inappropriate length may degrade the model's predictive accuracy or business utility.

For each account from a sample population, at the beginning of the performance window, termed either the prediction date, or the scoring date, a first snapshot of the account is taken.

In one embodiment of the invention, the snapshot comprises a credit score, such as a FICO score, and the credit report. A plurality of prediction variables is extracted from the report that evaluates all areas of the credit report. Trade line, inquiry, collection and public record information are all examined. The categories of predictive variables include, for example:
previous credit performance;
current level of indebtedness;
amount of time credit has been in use;
pursuit of new credit; and
types of credit available.

A second snapshot is generated as of the performance date, the end of the performance period. Based on the second snapshot, a dichotomous performance, such as good/bad performance for the duration of the performance period is determined. In this example, those accounts exhibiting bad payment behavior during the performance period are classified as "bad." One embodiment of the invention defines bad performance as incurring any of a plurality of adverse events once during the performance period. Those of ordinary skill in the art will readily recognize that other performance definitions are possible. All are within the scope of the invention. Bad performance may consist of any of, for example:
bankruptcies;
charge-offs;
loan defaults;
repossessions;
serious delinquency; and
other derogatory status indicators.

Therefore, in this example, any account exhibiting one or more occurrences of any of the above adverse events is assessed as having bad performance.

For each account, incremental balance incurred during the intermediate period is determined as the difference between balance at the first snapshot (predictive snapshot) and the balance at the third snapshot (intermediate snapshot).

In this example, because the sample segment of interest is that particular segment that has incremented credit balances, or, put differently, because the analytic solution is designed to rank order ability to handle payments given incremental balance, those accounts showing a lower balance or no change are classed as "indeterminate" and eliminated from consideration.

After the model is developed, it is important, however, to assess model performance for those with decreasing balance to make sure that any predicted behaviors from the model would apply equally well for those who go on to increase their balances and those who go on to decrease their balance. This is important because it is unknown at the time of scoring which consumers being assessed by the score will go on to increase, versus decrease, in their balance after the scoring date.

The incremental balance is used to weight each account's performance. In one embodiment of the invention, the higher the incremental balance, the greater the account is weighted. One skilled in the art will readily appreciate that weighting an account's good/bad performance based on the size of the incremental balance during the intermediate period has the effect of increasing the impact of large balance increasers in the weights optimization.

In one embodiment, the future impact model is implemented as scorecards. Scorecards are a form of predictive model that is well-suited for applications involving risk assessment. Conventionally, a scorecard produces scores that "rank-order" customers according to their likelihood of exhibiting a specific behavior, from low likelihood to high. Therefore, conventionally, a scorecard models main effects: good vs. bad, high vs. low revenue, fraud vs. non-fraud, and so on. Advantageously, the present invention implements a scorecard that models the statistical interaction between performance at the performance date and incremental debt as measured in the intermediate data, wherein likely performance varies by the amount of incremental debt. This interaction is operationalized as a function of modeling the performance measure directly, but including incremental debt into the sample weight such that incremental debt would be multiplied by performance in the optimization algorithm.

Previously, predictive models that modeled interactions as the performance definition of the type described herein have been unknown in general application. A scorecard is also particularly suited to applications such as the present one because it facilitates reporting of reason codes. A scorecard model is additionally advantageous because the model can accommodate a variety of data sources, e.g. income, application information, alternative data providers, etc.

Figure 6A:
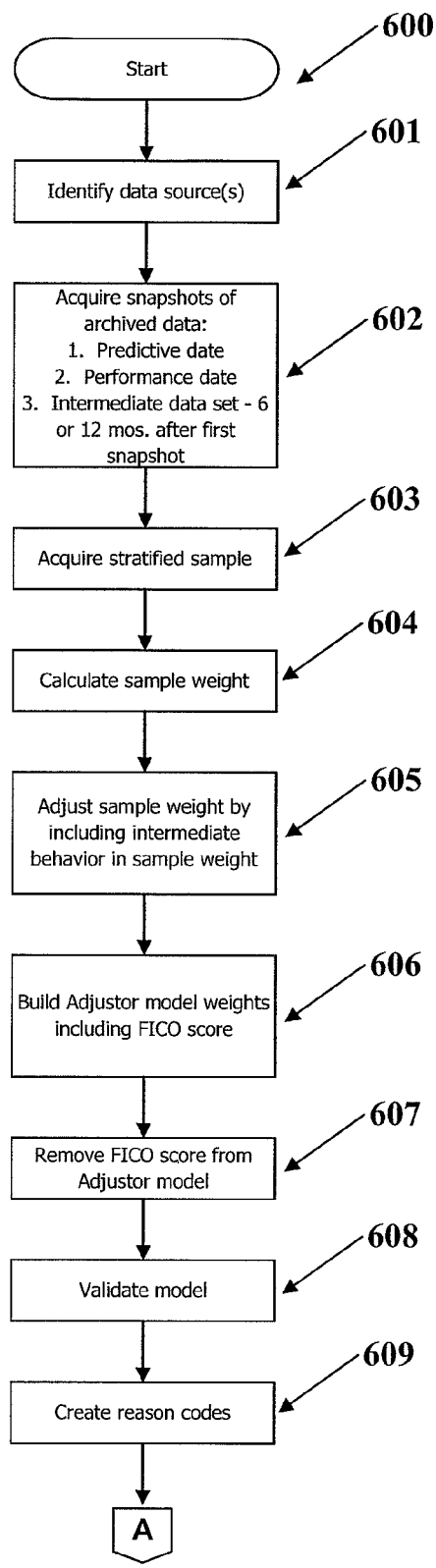
FIGS. 6a and b provide a flow diagram of a process for determining capacity.
Figure 6B:
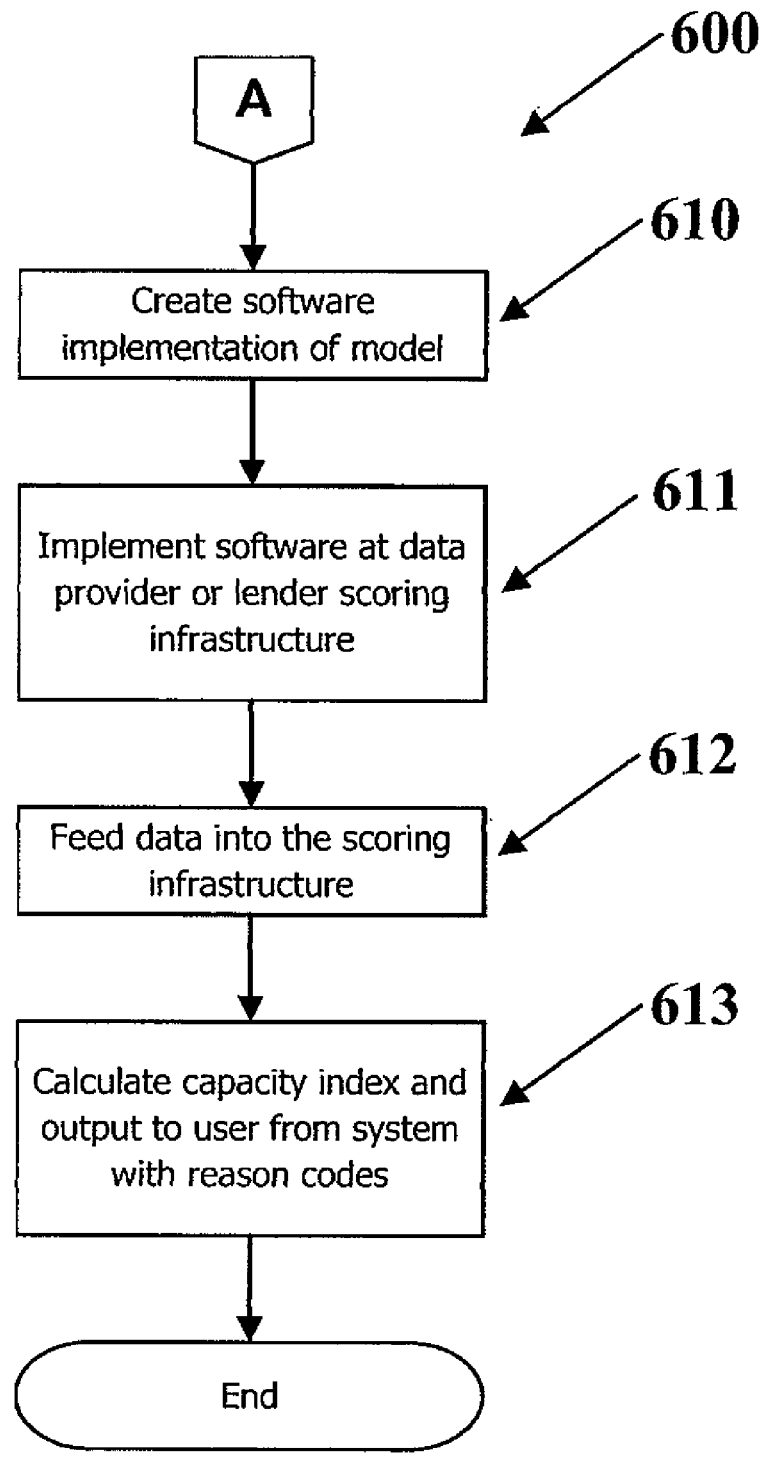

Turning now to FIGS. 6a and *b*, shown is a flow diagram of a method for determining future action impact that provides an analytic solution to differentiate individuals according to their behavior. For example, one embodiment of the invention provides a method that enables development of a score that rank orders individuals according to their capacity to assume incremental debt successfully. The method 600, based on the foregoing innovative modeling approach captures the statistical interaction between behavior and future actions.

Briefly, a method of determining capacity 600 includes the steps of:
- identifying data sources 601;
- acquire snapshots of archived data: predictive date, performance date, preferably 24 months following the scoring date and the intermediate data set, preferably 6 or 12 months after the predictive date 602;
- acquire an appropriate sample of the population, e.g. random sample, stratified sample, etc. 603;
- calculate sample weight as in FIG. 5 (or assign sample weight=1 if no sampling) 604;
- adjust sample weight by including intermediate behavior in the sample weight 605;
- build adjustor model weights on margin to FICO score 606;
- remove FICO score from adjustor model 607;
- validate model 608;
- create reason codes 609;
- create software implementation of model 610;
- implement software at data provider of lender scoring infrastructure 611;
- feed data into the scoring infrastructure 612; and
- calculate capacity index and output to user from system with reason codes 613.

The foregoing sequence of steps and sub-processes is meant to be exemplary only. In fact the ordering of the various steps of the method may vary considerably. Additional embodiments may include more or fewer steps than those shown in FIGS. 6a and *b*.

The ordinarily-skilled practitioner will appreciate that there exist a number of applications for future action impact modeling, as disclosed herein. In all events, a base score is provided as a starting point for future action impact modeling. The invention uses a score that is relevant to the action being modeled as a base score. In the case of credit risk scores, the FICO score may be used as a base score. Thus, the invention comprises a technique that starts with a base score that is statistically controlled because of its correlation with a future impact. In the final score's delivered state, the base score is removed from the final score itself, so that the final value corresponds to the impact of the future behavior, independent of the base score, using a statistically valid approach, such as calculation on a common scale.

Having generated the base score, a series of predictive characteristics are generated. Typically, the predictive characteristics are those that are found, in the example of a credit risk score, in the consumer's credit report, for example:
- the consumer's payment history (i.e., the presence and/or severity of prior delinquency);
- amounts the consumer owes on all accounts or a subset of accounts; duration of credit history;
- attempts to and or instances of opening new credit;
- mix of credit types (such as installment, auto, credit card, mortgage, etc.)
- File thickness (i.e., number of credit cards, trade lines).

Having gathered the data comprising the predictive variables including, for the purpose of eliminating co-variation, the credit score (for example, in the case of credit risk analysis), the raw data itself is used to optimize a model in which predictive weights are developed that in combination represent the predictive model. The inclusion of the credit score for the purpose of eliminating co-variation is described in greater detail herein below.

The predictive model utilizes the foregoing future action impact (FAIM) modeling approach, which (in this embodiment) simulates the consumer's performance in view of additional debt incurred, for example, in response to a consumer's application for a mortgage. The predictive model described herein is able to predict the impact of the additional debt on the relative riskiness of the account that the mortgage represents, if booked.

In one embodiment, performance is defined as good/bad performance given incremental balance. As such, the interaction between simulated balance increase and performance is modeled. The interaction is modeled by multiplying the performance definition by the intermediate behavior of interest. In one embodiment, good/bad binary performance is preferably multiplied by incremental balance as quantified at the intermediate snapshot. However, non-binary performance definitions are also within the scope of the invention.

The model output in this embodiment comprises a measure of future action impact referred to as a capacity index that estimates the consumer's capacity to assume the additional debt without default. The ordinarily-skilled practitioner will understand that the capacity index preferably assumes the form of a numerical score. One embodiment of the invention utilizes a scale that rank orders consumers from highest to lowest according to capacity. The score is intended to be used at a fixed level of risk. Thus, one having a high capacity relative to their risk cohort has a correspondingly high index. One having a low capacity relative to their risk cohort has a correspondingly low index. Another embodiment of the invention rank orders consumers from highest to lowest according to debt sensitivity, with those having high debt sensitivity corresponding to those having low capacity and those having low debt sensitivity corresponding to those having high capacity.

Finally, a developmental data set is fed into a software modeling tool that determines the relationships among the variables and generates a predictive model that rewards good performance and penalizes bad performance such that accounts showing a high capacity are ranked higher than accounts showing low capacity.

One embodiment of the invention employs the MODEL BUILDER application (FAIR ISAAC, INC., Minneapolis Minn.), a proprietary modeling tool with which one can visualize and explore predictive patterns, define predictive variables, build models, evaluate their quality and deploy them.

Other modeling tools may occur to the ordinarily-skilled practitioner. All are within the scope of the invention.

One goal of the invention, however, is to determine a particular future action impact, such as a consumer's capacity for increased debt, where such embodiment makes the determination independent of a covariate, i.e. base score, such as risk. In this example, in order to arrive at a value that is a pure expression of capacity without the confounding influence of a risk score, an embodiment of the invention employs a method of adjusting the analytic model to control for risk, thereby enabling the risk element to be isolated and removed from the performance tag. Those skilled in the art will recognize that the selection of a base score is determined by the application. This adjustor technology includes the full resolution of a covariate into the score, builds scores including the covariate, and then allows the covariate to be statistically partialed from the score. In one embodiment, the baseline risk is the covariate and it is statistically controlled from measures of balance sensitivity, such as capacity, using adjustor technology. This approach allows a lender to answer the question "If risk is controlled for, how balance sensitive will the consumer be?" The invention recognizes that, in order to isolate risk from capacity, one can subtract a risk score from the raw performance tag. The remaining value is a pure expression of capacity at least partially de-correlated from risk.

Experiment I

Figure 7:
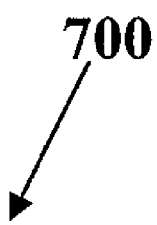
FIG. 7 provides a table illustrating risk score distribution according to capacity in a validation data set.

Refer to FIG. 7 for the following discussion. One skilled in the art will recognize that, in the risk-scoring domain, a "bad" constitutes someone who has failed to repay their debts as promised. For one reason or another, these consumers that go on to show bad performance are unable to take responsibility for debts previously incurred. "Goods," however, includes consumers with high income and ability to pay, and those with less ability, but more discretion not to spend beyond their ability to repay as promised. Accordingly, "goods" are not necessarily high-capacity. It was desired to validate the future impact model with a data set that would show whether it was possible to distinguish between "bads," low-capacity "goods" and high-capacity "goods." Experiment I involves a validation using a validation data set made up of credit bureau data provided by TRANSUNION, LLC, Chicago, Ill. The validation data set described herein involves a cohort of subjects all having a FICO score in the band of 660-<700. The particular implementation validated involved a 24-month performance window and a 6-month intermediate period during which consumer actions were tracked.

Using a predictive model as described herein above, consumer capacity was predicted at the scoring date. As of the scoring date, subsequent behavior, because, in actuality it would be unknown as of the scoring date, was not taken into account at the scoring date, however some will increase credit usage within the intermediate period and others will not.

Subjects were then categorized based on behaviors captured from credit bureau data following the scoring date. The three categories were:
 did not open a bankcard;
 opened a bank card with a small balance; and
 opened a bank card with a large balance.
The performance definition was:
 bad=90+days delinquent on any tradeline;
 good=non-bad.

Referring to FIG. 7, the table 700 shows that risk, i.e. performance, remained constant across all capacity levels.

Figure 8:
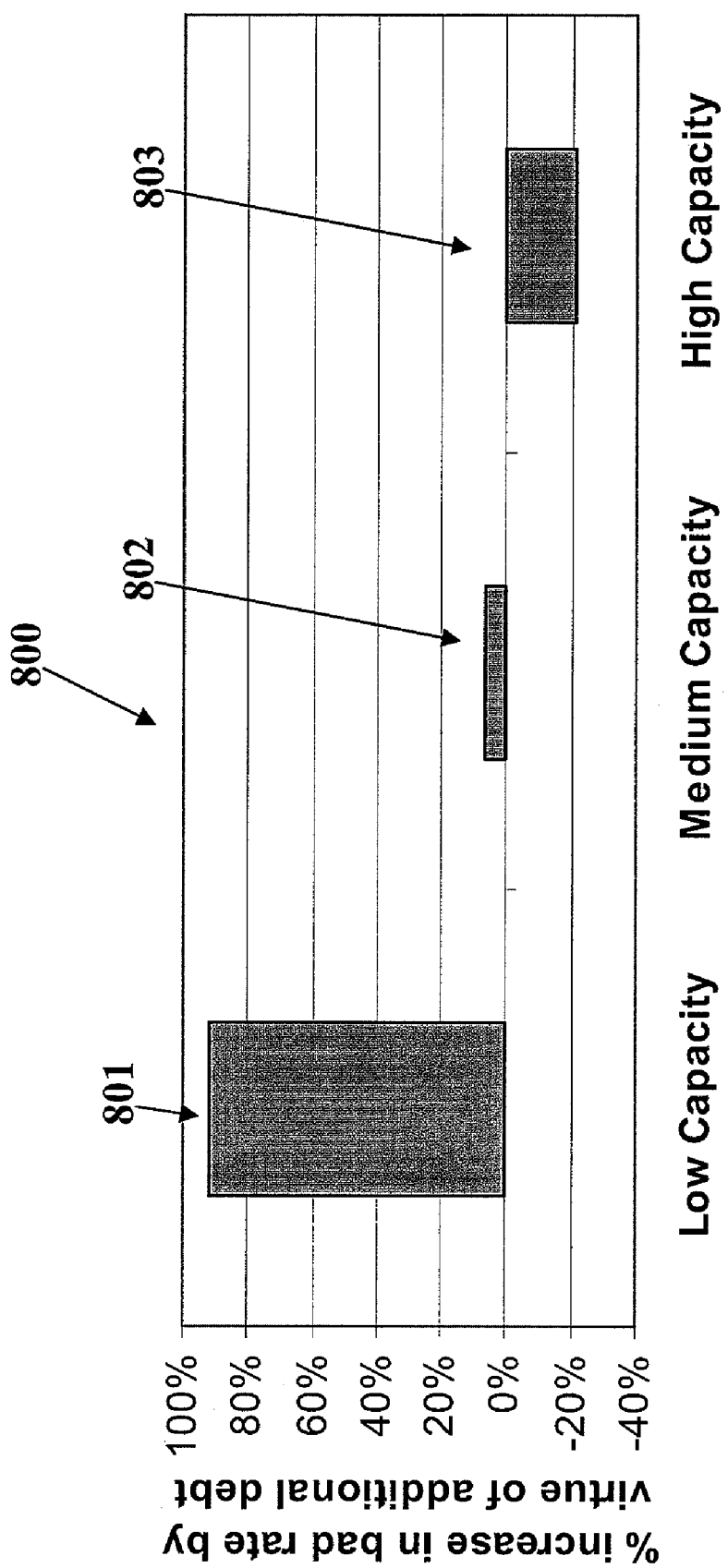
FIG. 8 provides a vertical bar chart illustrating percentage increase in bad rate by virtue of additional debt versus capacity in the validation data set of FIG. 7.

As shown in the chart 800 of FIG. 8, among subjects determined to have low capacity 801, the bad rate increased by over 90 percent as a result of opening a new card with a high balance. In sharp contrast, among high-capacity subjects 803, the bad rate decreased by 20 percent. Among medium-capacity subjects 802, the bad rate increased by 6-7 percent. While the raw data validate both the hypothesis underlying the capacity index and the predictive model, the validation data become more meaningful when they are normalized.

The data of FIG. 8 were normalized by adding twenty percentage points, which resulted in 0 percent increase in the bad rate for high-capacity subjects, a 27 percent increase in bad rate for medium capacity subjects and a 110 percent increase in bad rate for low-capacity subjects. Thus, the span between low-capacity and high-capacity subjects was 110 percentage points; the span between low- and medium-capacity subjects was 83-84 percentage points; and the span between medium- and high-capacity subjects was 27 percentage points. As such, the validation data set clearly shows there was little or no increase, and possibly a decrease in bad rate among high-capacity subjects, while the bad rate almost doubled in low-capacity subjects. In medium capacity subjects, there was a slight but significant increase in bad rate.

Figure 9:
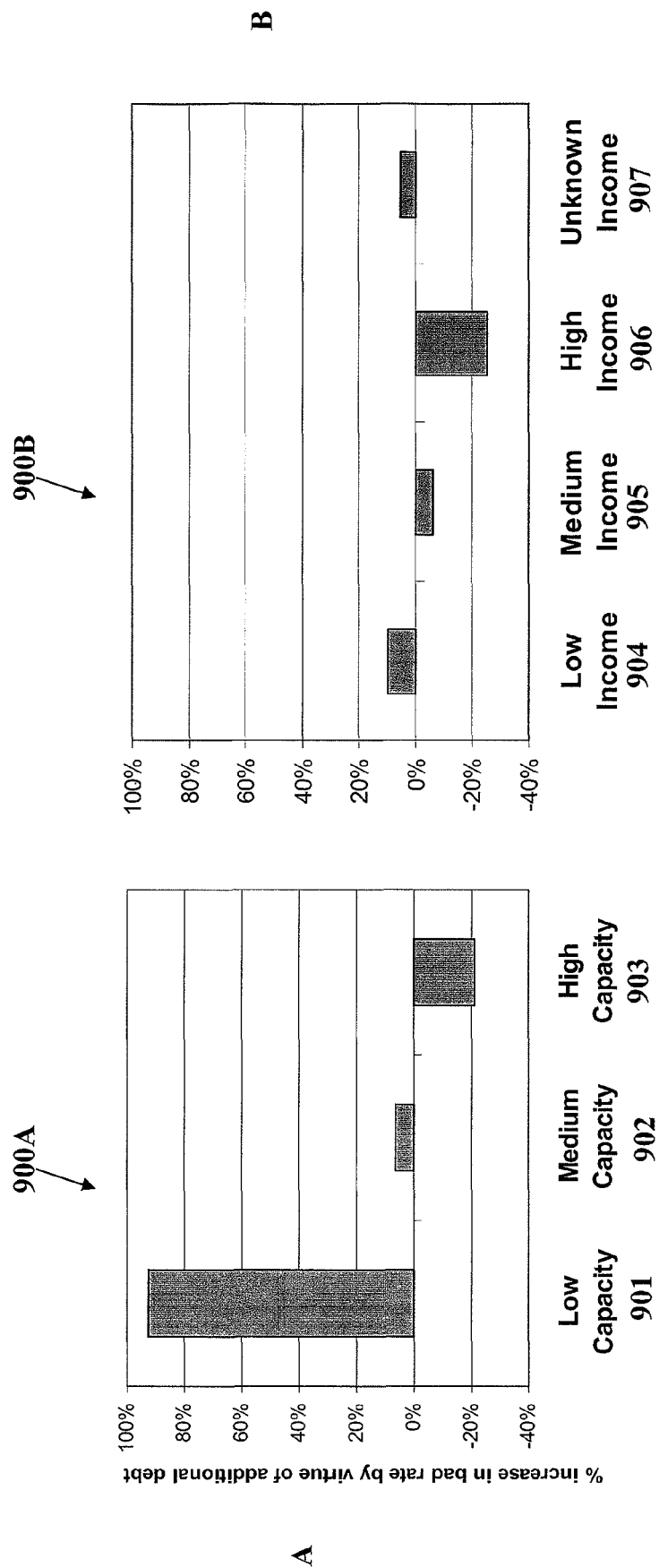
FIGS. 9a and b provide bar charts that graph percentage increase in bad rate by virtue of additional debt versus credit and income, respectively in the validation data set of FIG. 8

FIG. 9 compares the accuracy with which the capacity index described above identifies consumers for whom an increase in debt burden will increase their default rate versus the accuracy for income data, such as debt-to-income ratios. The chart 900a of FIG. 9A depicts the same data as that of FIG. 8. The chart 900b of FIG. 9B depicts increase in bad rate as a function of reported income. While high income 906 appears to relate nearly as closely to the percentage increase in bad rate by virtue of additional debt, that is, those who report a high income also handle increased debt successfully; low reported income does not relate nearly as closely to an increase in bad rate as low-capacity does. Those reporting low income showed only a 10 percent increase in bad rate, as opposed to an increase in bad rate of over 90 percent for low-capacity subjects. Thus, the data show that low income is only weakly correlated with capacity. There are, therefore a significant number of low-income individuals who may, in fact, be medium- or even high-capacity.

FIG. 9B also reveals that there exist a number of subjects for income is unknown 907 and that a small but insignificant increase in bad rate was shown for this group. In this example, income is a typical analytic for measuring capacity. The existence of this fourth group of subjects 907 illustrates a further strength of the capacity index. The capacity index rank orders consumers according to their predicted ability to successfully handle an increase in debt, without relying on income data. The group of subjects for whom no income data is available represent a group about which it is difficult to make predictions regarding the ability to handle increased debt successfully. By eliminating the need for income data, the capacity index does away with this group.

Experiment II

Figure 10:
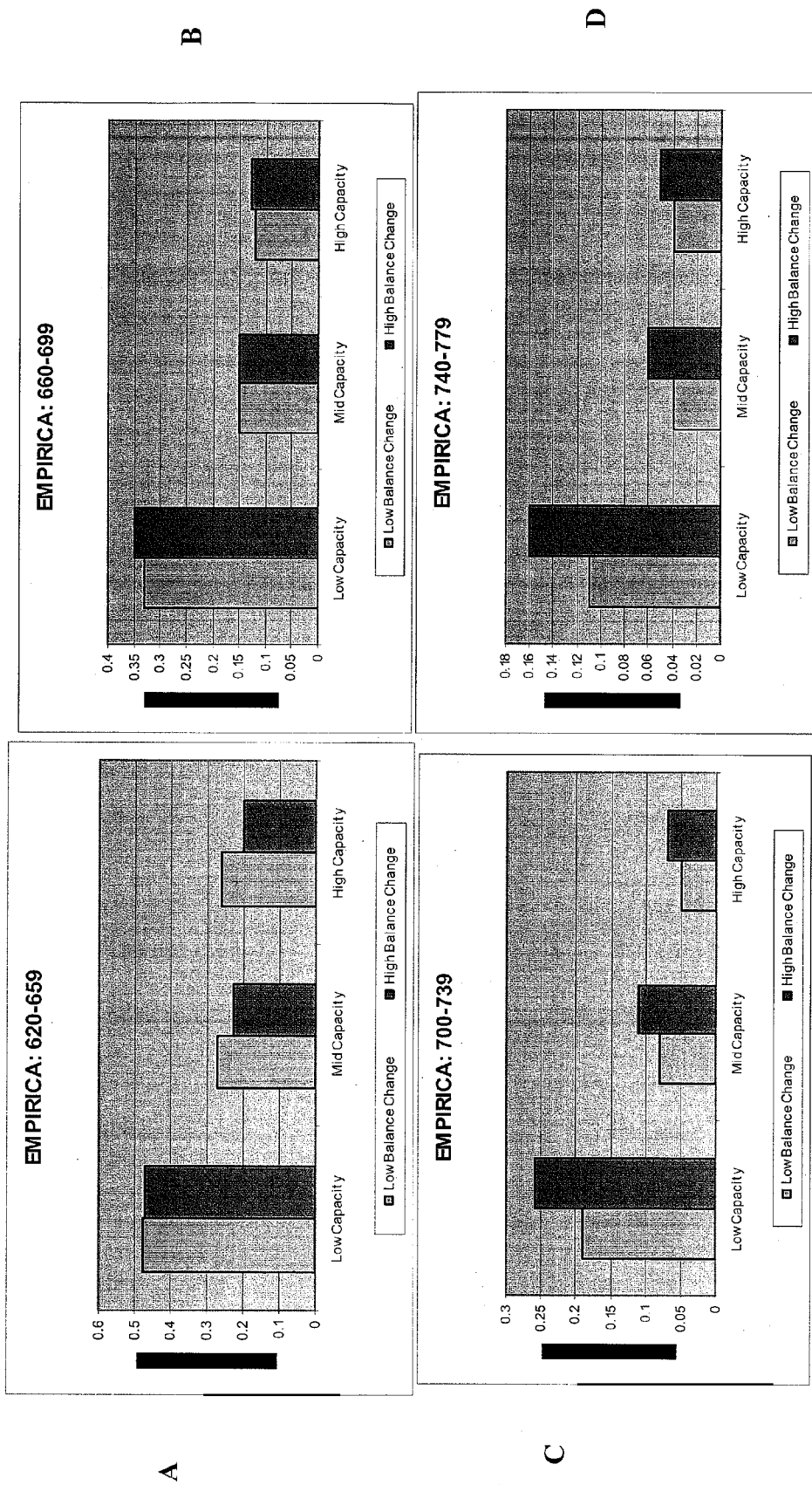
FIGS. 10a-d provide a series of bar charts that graph performance versus balance for from a validation data set.

FIGS. 10A-D provide a series of bar charts depicting performance vs. balance change for four segments, risk score=620-659 (FIG. 10A), 660-699 (FIG. 10B), 700-739 (FIG. 10C) and 740-700 (FIG. 10D). The present validation data set comprises credit bureau data regarding management of revolving credit card accounts. In this example, income is from a demographic database because different sources of income have different sources and missing rates. Another strength of this approach is that it does not rely on self-reported information, e.g. self-reported income, which is notoriously inaccurate. As shown in FIG. 10A, within each segment, as capacity increases, the "bad" rate decreases. Additionally, across segments, the "bad" rate decreases from one segment to the next, each segment corresponding to a higher FICO segment. Somewhat anomalously, in FIG. 10A, the bad rate for mid-level- and high-capacity exhibit a higher "bad" rate for low balances than for high balances. As in validation data set I, such anomaly may be explained by the riskiness of the entire segment, no matter what the capacity index (CI) is. For all other groups in the remaining segments, with the expectation of the mid-level capacity index (CI) in FIG. 10B, the "bad" rate is lower for low balances vs. high balances.

Figure 11:
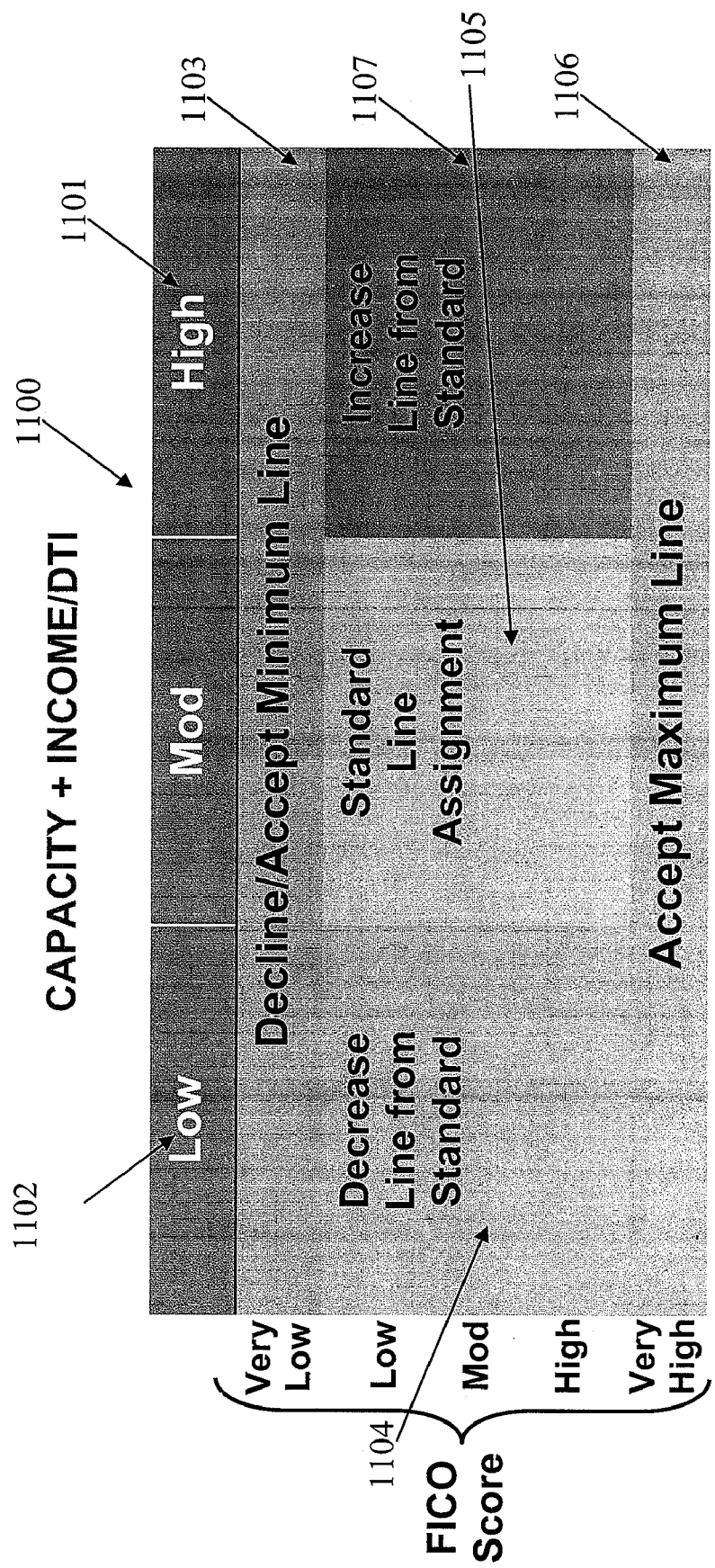
FIG. 11 provides a chart illustrating implementation of a service that incorporates capacity index.

FIG. 11 provides a chart describing a practical implementation 1100 of one embodiment of the future action impact modeling techniques disclosed herein, i.e. the capacity index (CI) that uses the capacity index on margin to a strategy using a risk score such as the FICO score, for example and income for an initial credit line decision:

target consumers with high capacity 1101 for higher initial credit lines; and target consumers with lower capacity 1102 for lower initial credit lines.

The modeling approach described herein provides at least the following advantages:

The technology is not specific to data type, application, or performance definition; it can be applied to any simulatable forward-looking problem on any data source;

While future action impact modeling may be used to model the capacity problem, the innovations are generically applicable modeling principles, independent of the capacity problem or specific types of financial services and/or credit bureau data, and have broader applicability to the analytic community.

As previously described, the methods and approaches herein described are preferably implemented by means of, for example, a data-processing system such as described with regard to FIG. 1. Alternatively, the methods and approaches herein described are implemented by means of, for example, a credit-scoring system.

The ordinarily-skilled practitioner will appreciate that various other computing arrangements are possible to support the functions described herein. For example, all or any portion of the functions may be combined as discrete software components or logic circuits on a single computing device such as a server. In other embodiments, functional elements may be distributed across a plurality of servers or other suitable computing devices in a variety of arrangements and configuration. All are within the scope of the invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense. One of ordinary skill will recognize that the foregoing examples are illustrative and are not intended to limit the invention.

The invention claimed is:

1. A method for implementation by one or more data processors comprising:

generating, by at least one data processor, a predictive model from a sample population based on:

a predictive snapshot gathered at a past sample scoring date, the predictive snapshot comprising a credit score;

a performance snapshot gathered at a sample performance date subsequent to the scoring date, the performance snapshot representing one of a good performance and a bad performance; and intermediate information gathered at a sample intermediate date between said scoring date and said performance date, the intermediate information representing an action of an individual out of the sample population at the sample intermediate date, the performance being in response to the action of the individual out of the sample population, wherein a time period between the past sample scoring date and the sample intermediate date is a predetermined first time interval;

inputting, by at least one data processor, a profile of a consumer to a software implementation of said generated predictive model executing on a computing device;

determining, by at least one data processor, a current credit score on current date;

simulating, by at least one data processor using the generated predictive model, an impact on the consumer's profile of likely future actions of the consumer, the likely future actions performed on a future intermediate date, the likely future actions causing the impact on a future performance date, the simulating comprising:

computing, by at least one data processor, a capacity index that rank-orders consumers according to the impact of the likely future actions, the capacity index representing a capacity of a consumer to take additional debt without defaulting later, the capacity being represented as a second score;

adjusting, by at least one data processor, said second score to control for covariate effects; and outputting, by at least one data processor, said adjusted score, wherein the generated predictive model predicts a statistical interaction of the impact of the likely future actions with the likely future actions.

2. The method of claim 1, wherein said generating a predictive model comprises:

identifying, by at least one data processor, data sources for said information;

generating, by at least one data processor, a stratified sample from said information acquiring, by at least one data processor, said snapshots and said intermediate information;

calculating, by at least one data processor, sample weights;

adjusting, by at least one data processor, sample weights by including intermediate behavior;

building, by at least one data processor, adjustor model weights, including a base score;

removing, by at least one data processor, the base score from said adjustor model;

validating, by at least one data processor, said predictive model; and creating, by at least one data processor, reason codes, wherein the reason codes are output with the adjusted score.

3. The method of claim 2, wherein said generating sample weights comprises:

generating, by at least one data processor, predictive variables from the predictive snapshot;

generating, by at least one data processor, a base score on said predictive snapshot;

generating, by at least one data processor, performance on said performance snapshot;

generating, by at least one data processor, interaction of predictive variables with simulated predictive variables on said predictive snapshot; and generating, by at least one data processor, intermediate behavior on the intermediate information.

4. The method of claim 1, wherein said predictive snapshot comprises a credit risk score and prediction characteristics for each member of said sample population at the beginning of a predetermined performance window;
    wherein performance comprises performance behavior on reported trade lines for duration of said performance window; and
    wherein said intermediate information comprises incremental balance incurred during said intermediate interval, wherein said performance is weighted by said intermediate information.

5. The method of claim 1, wherein said covariate comprises a base score, and wherein the adjusting of the second score comprises statistically partialing out the base score from the second score such that the capacity of the consumer to take additional debt is independent of the base score.

6. The method of claim 1, wherein one or more profile types likely to be underrepresented in a random sample are over sampled relative to said source population and wherein profile types are selectively weighted in a manner so that the weighted distribution of profile types mirrors the raw distribution of profile types in the source population.

7. The method of claim 1, wherein time period between the past sample scoring date and the sample performance date is a predetermined second time interval, and
    wherein a time period between the current date and the future intermediate date is equal to the predetermined first time interval and time period between the current date and the future performance date is equal to the predetermined second time interval.

8. The method of claim 1, wherein the good performance comprises repayment of additional debt undertaken by the individual; and
    wherein the bad performance comprises the consumer being involved in at least one of the following: bankruptcies, charge-offs, loan defaults, repossessions, serious delinquency, and other derogatory status indicators.

9. The method of claim 1, wherein the predictive snapshot further comprises a credit score report, the credit score report representing prediction variables at the past sample scoring date,
    wherein the prediction variables include previous credit performance, current level of indebtedness, amount of time credit has been in use, pursuit of new credit, and types of credit available.

10. An apparatus for modeling future action impact in credit scoring comprising:
    a computing device, said computing device comprising a processing component and a storage component; and
    computer-readable instructions residing in said storage component which, when executed by said processing component instruct said processor to perform operations comprising:
    generating a predictive model from a sample population based on:
    a predictive snapshot gathered at a past sample scoring date, the predictive snapshot comprising a credit score;
    a performance snapshot gathered at a sample performance date subsequent to the scoring date, the performance snapshot representing one of a good performance and a bad performance; and
    intermediate information gathered at a sample intermediate date between said scoring date and said performance date, the intermediate information representing an action of an individual out of the sample population at the sample intermediate date, the performance being in response to the action of the individual out of the sample population, wherein a time period between the past sample scoring date and the sample intermediate date is a predetermined first time interval;
    inputting a profile of a consumer to a software implementation of said generated predictive model executing on a computing device;
    determining a current credit score on current date;
    simulating, using the generated predictive model, an impact on the consumer's profile of likely future actions of the consumer, the likely future actions performed on a future intermediate date, the likely future actions causing the impact on a future performance date, the simulating comprising:
        computing a capacity index that rank-orders consumers according to the impact of the likely future actions, the capacity index representing a capacity of a consumer to take additional debt without defaulting later, the capacity being represented as a second score;
        adjusting said second score to control for covariate effects; and
        outputting said adjusted score.

11. The apparatus of claim 10, wherein generating a predictive model comprises:
    identifying data sources for said information;
    generating a stratified sample from said information
    acquiring said snapshots and said intermediate information;
    calculating sample weights;
    adjusting sample weights by including intermediate behavior;
    building adjustor model weights, including a base score;
    removing base score from said adjustor model;
    validating said predictive model; and
    creating reason codes, wherein the reason codes are output with the adjusted score.

12. The apparatus of claim 10, wherein generating sample weights comprises:
    generating predictive variables from the predictive snapshot;
    generating a base score on said predictive snapshot;
    generating performance on said performance snapshot;
    generating interaction of predictive variables with simulated predictive variables on said predictive snapshot; and
    generating intermediate behavior on the intermediate information.

13. The apparatus of claim 10, wherein said predictive snapshot comprises a credit risk score and prediction characteristics for each member of said sample population at the beginning of a predetermined performance window;
    wherein performance comprises performance behavior on reported trade lines for duration of said performance window; and
    wherein said intermediate information comprises incremental balance incurred during said intermediate interval, wherein said performance is weighted by said intermediate information.

14. The apparatus claim 10, wherein said covariate comprises a base score, and wherein the adjusting of the second score comprises statistically partialing out the base score from the second score such that the capacity of the consumer to take additional debt is independent of the base score.

15. The apparatus of claim 10, wherein one or more profile types likely to be underrepresented in a random sample are over sampled relative to said source population and wherein profile types are selectively weighted in a manner so that the weighted distribution of profile types mirrors the raw distribution of profile types in the source population.

16. A non-transitory computer-readable storage medium having computer-readable instructions for simulating impact of future events on a consumer's profile embodied therein, said computer-readable instructions comprising instructions for:

generating a predictive model from a sample population based on:

a predictive snapshot gathered at a past sample scoring date, the predictive snapshot comprising a credit score;

a performance snapshot gathered at a sample performance date subsequent to the scoring date, the performance snapshot representing one of a good performance and a bad performance; and intermediate information gathered at a sample intermediate date between said scoring date and said performance date, the intermediate information representing an action of an individual out of the sample population at the sample intermediate date, the performance being in response to the action of the individual out of the sample population, wherein a time period between the past sample scoring date and the sample intermediate date is a predetermined first time interval;

inputting a profile of a consumer to a software implementation of said generated predictive model executing on a computing device;

determining a current credit score on current date;

simulating, using the generated predictive model, an impact on the consumer's profile of likely future actions of the consumer, the likely future actions performed on a future intermediate date, the likely future actions causing the impact on a future performance date, the simulating comprising:

computing a capacity index that rank-orders consumers according to the impact of the likely future actions, the capacity index representing a capacity of a consumer to take additional debt without defaulting later, the capacity being represented as a second score;

adjusting said second score to control for covariate effects; and outputting said adjusted score.

17. The computer-readable medium of claim 16, wherein said instructions for generating a predictive model comprise instructions for:

identifying data sources for said information;

generating a stratified sample from said information acquiring said snapshots and said intermediate information;

calculating sample weights;

adjusting sample weights by including intermediate behavior;

building adjustor model weights, including a base score;

removing base score from said adjustor model;

validating said predictive model; and creating reason codes, wherein the reason codes are output with the adjusted score.

18. The computer-readable medium of claim 17, wherein said instructions for generating sample weights comprise instructions for:

generating predictive variables from the predictive snapshot;

generating a base score on said predictive snapshot;

generating performance on said performance snapshot;

generating interaction of predictive variables with simulated predictive variables on said predictive snapshot; and generating intermediate behavior on the intermediate information.

19. The computer-readable medium of claim 16, wherein said predictive snapshot comprises a credit risk score and prediction characteristics for each member of said sample population at the beginning of a predetermined performance window;

wherein performance comprises performance behavior on reported trade lines for duration of said performance window; and wherein said intermediate information comprises incremental balance incurred during said intermediate interval, wherein said performance is weighted by said intermediate information.

20. The computer-readable medium of claim 16, wherein said covariate comprises a risk score, wherein said risk score is statistically partialed out from said score indicative of the impact of the simulated action on the consumer's profile.

21. The computer-readable medium of claim 16, wherein one or more profile types likely to be underrepresented in a random sample are over sampled relative to said source population and wherein profile types are selectively weighted in a manner so that the weighted distribution of profile types mirrors the raw distribution of profile types in the source population.

* * * * *